US012710725B2

(12) United States Patent
Hernandez et al.

(10) Patent No.: US 12,710,725 B2
(45) Date of Patent: Aug. 18, 2026

(54) SPIRAL SPRING FOR A HOROLOGICAL RESONATOR MECHANISM PROVIDED WITH MEANS FOR ADJUSTING THE STIFFNESS

(71) Applicant: Omega SA, Biel/Bienne (CH)

(72) Inventors: Ivan Hernandez, Cressier (CH); Romain Le Moal, Villers-le-Lac (FR); Roberto Frosio, Chambrelien (CH); Pierre Cusin, Villars-Burquin (CH)

(73) Assignee: OMEGA SA, Biel/Bienne (CH)

( * ) Notice: Subject to any disclaimer, the term of this patent is extended or adjusted under 35 U.S.C. 154(b) by 392 days.

(21) Appl. No.: 18/474,448

(22) Filed: Sep. 26, 2023

(65) Prior Publication Data

US 2024/0126209 A1 Apr. 18, 2024

(30) Foreign Application Priority Data

Oct. 18, 2022 (EP) .................................... 22202267

(51) Int. Cl.

| | |
|---|---|
| ***G04B 17/34*** | (2006.01) |
| ***G04B 17/06*** | (2006.01) |
| ***G04B 17/32*** | (2006.01) |
| ***G04B 18/02*** | (2006.01) |

(52) U.S. Cl.

CPC ........... *G04B 17/345* (2013.01); *G04B 17/06* (2013.01); *G04B 17/325* (2013.01); *G04B 18/026* (2013.01)

(58) Field of Classification Search

None

See application file for complete search history.

(56) References Cited

U.S. PATENT DOCUMENTS 7,293,913 B2 * 11/2007 Peters .................. G04B 17/066 368/178

2022/0171336 A1 * 6/2022 Kahrobaiyan ......... G04B 18/06

FOREIGN PATENT DOCUMENTS

| | | | | |
|---|---|---|---|---|
| CH | 703 273 B1 | | 2/2015 | |
| EP | 2138912 A1 | * | 12/2009 | ........... G04B 17/066 |
| EP | 2 138 912 B1 | | 7/2012 | |
| EP | 4 009 115 A1 | | 6/2022 | |
| JP | 2022-88332 A | | 6/2022 | |

OTHER PUBLICATIONS

European Search Report for EP 22 20 2267 dated Feb. 1, 2023.

* cited by examiner

*Primary Examiner* — Renee S Luebke
*Assistant Examiner* — Michael James Walker
(74) *Attorney, Agent, or Firm* — Sughrue Mion, PLLC

(57) ABSTRACT

A spiral spring for a horological resonator mechanism, including a flexible strip (2) coiled on itself into several turns, the strip (2) having a predefined stiffness. The spring (1) include an element for adjusting its stiffness, including a unique elongate flexible element (5) arranged in series with the strip (2), and connecting one end (4) of said strip (2) to a fixed support (11), to add additional stiffness. The flexible element (5) has a stiffness higher than that of the strip (2). A prestressing element (6) applies two different efforts on the element (5), and includes a first lever (8) attached to the end (4) of the strip (2) to allow adjusting a first effort, and a second lever (8) also attached to the end (4) of the strip (2) to adjust a second effort independently of the first effort.

20 Claims, 1 Drawing Sheet

SPIRAL SPRING FOR A HOROLOGICAL RESONATOR MECHANISM PROVIDED WITH MEANS FOR ADJUSTING THE STIFFNESS

CROSS REFERENCE TO RELATED APPLICATIONS

This application claims priority to European Patent Application No. 22202267.5 filed Oct. 18, 2022.

TECHNICAL FIELD OF THE INVENTION

The invention relates to a spiral spring for a horological resonator mechanism, the spiral spring being provided with means for setting the stiffness of said spiral spring. The invention also relates to a horological resonator mechanism provided with such a spiral spring.

TECHNOLOGICAL BACKGROUND

Most current mechanical watches are provided with a spiral balance and an escapement mechanism of the Swiss pallets type. The spiral balance forms the time base of the watch. This is also called resonator.

In Turn, the Escapement Fills Two Main Functions:

- sustaining the reciprocating movements of the resonator;
- counting these reciprocating movements.

To form a mechanical resonator, an inertial element, a guide and an elastic return element are necessary. Conventionally, a spiral spring serves as an elastic return element for the inertial element formed by a balance. This balance is rotatably guided by pivots which rotate in plain bearings made of ruby.

In general, the balance spiral spring should be able to be set to improve the accuracy of a watch. For this purpose, means for adjusting the stiffness of the spiral spring are used, such as an index for modifying the effective length of the spring. Thus, its rigidity is modified to adjust the accuracy of running of the watch. Nonetheless, the effectiveness of a conventional index for adjusting the running remains limited, and it is not always effective for making the setting accurate enough, in the range of a few seconds or a few tens of seconds per day.

For finer adjustment of running, there are setting means comprising one or more screw(s) arranged in the felloe of the balance. By acting on the screws, the inertia of the balance is modified, which results in modifying running thereof.

However, this setting method is not easy to perform, because it disturbs the equilibrium of the balance, and still does not allow obtaining enough fineness of setting of the running of the oscillator.

SUMMARY OF THE INVENTION

The present invention aims to overcome all or part of the aforementioned drawbacks, by providing a spiral spring provided with effective and accurate adjustment means, configured in particular to set running of a timepiece by modifying the effective stiffness of said spiral.

To this end, the invention relates to a spiral spring, in particular for a horological resonator mechanism, the spiral spring comprising a flexible strip coiled on itself into several turns, the strip having a predefined stiffness, the spiral spring including means for adjusting its stiffness, the adjustment means including a unique elongate flexible element arranged in series with the strip, the elongate flexible element connecting one end of said strip to a fixed support, so as to add an additional stiffness to the strip, the elongate flexible element preferably having a stiffness higher than that of the strip, the adjustment means including prestressing means to apply at least two different efforts on the elongate flexible element.

The invention is remarkable in that the prestressing means include a first lever attached to the end of the strip so as to allow adjusting a first effort, the prestressing means including a second lever also attached to the end of the strip so as to be able to adjust a second effort independently of the first effort.

Thanks to the invention, it is possible to modify the stiffness of the elongate flexible element, such as a flexible blade. Indeed, when two efforts are applied, the stiffness of the elongate flexible element is varied. With one single effort applied, whether it is a force or a torque, the stiffness of the elongate flexible element remains the same. With two perpendicular forces on the blade, longitudinally and orthogonally, an overall force is obtained, which makes the stiffness of the elongate flexible element vary. With a force and a torque, the stiffness is also modified. The combination of two efforts is essential to be able to modify the stiffness.

By acting on the prestressing means, the intensity level of the load is modulated, which results in a modification of the stiffness of the set comprising the flexible element and the strip. Indeed, the flexible element set in series with the strip brings in an additional stiffness, which combines with that of the strip. Thus, when the prestressing means apply variable efforts on the flexible element, they modify the stiffness of the flexible element and therefore of the set comprising the strip and the flexible element without modifying the stiffness of the strip, regardless of the variable forces applied on the elongate flexible element.

In other words, a flexible element is placed in series with the strip between one end of the strip and the fixed support. This flexible element brings in an adjustable additional stiffness between the strip and the attach point of the strip, and thus confers more flexibility on the resonator. Thus, the effective stiffness of the resonator comprises the stiffness of the strip and the stiffness of the flexible element. The variable efforts for prestressing the flexible element are applied, preferably without prestressing the strip. By prestressing the flexible element, its stiffness changes, whereas the stiffness of the strip remains substantially unchanged. By changing the stiffness of the flexible element, the stiffness of the resonator (stiffness of the strip and stiffness of the flexible element) changes, which consequently modify running of the resonator.

Consequently, a modification of the rigidity of the flexible element modifies the rigidity of the entire resonator, and consequently finely sets running thereof, which allows accurately adjusting the frequency of the time base. Thus, a great accuracy in setting of the running is obtained, because one single additional element is finely acted upon to adjust the rigidity of the spiral spring.

Furthermore, each of the two levers allows performing a prestress setting independently of one another, so that a more accurate setting is obtained. In addition, if the levers are different from each other, two different intensity settings are obtained.

According to a particular embodiment of the invention, the first effort is imparted, either by a first tensile/compressive force directed substantially in the longitudinal direction of the elongate flexible element, or by a first force directed substantially in a direction substantially orthogonal to the longitudinal direction of the elongate flexible element, or by a first torque, preferably a bending moment, so as to make the stiffness of the elongate flexible element vary according to the prestress level.

According to a particular embodiment of the invention, the second effort is imparted either by a second tensile/compressive force directed substantially in the longitudinal direction of the elongate flexible element, or by a second force directed substantially in a direction substantially orthogonal to the longitudinal direction of the elongate flexible element, or by a second torque, preferably a bending moment, so as to make the stiffness of the elongate flexible element vary according to the prestress level.

According to a particular embodiment of the invention, the prestressing means are configured to exert a third effort on the elongate flexible element, the third effort being imparted, respectively at the first effort, either by a force directed substantially in a direction substantially orthogonal to the longitudinal direction of the elongate flexible element, or by a torque, preferably a bending moment.

According to a particular embodiment of the invention, the prestressing means are configured to exert a third effort on the elongate flexible element, the third effort being imparted, respectively at the first effort, either by the first tensile/compressive force, or by the substantially orthogonal first force, or by the first torque. According to a particular embodiment of the invention, the third effort is adjustable by the first lever.

According to a particular embodiment of the invention, the third effort is adjustable by the first lever.

According to a particular embodiment of the invention, the prestressing means are configured to exert a fourth effort on the elongate flexible element, the fourth effort being imparted, respectively at the second effort, either by the second tensile/compressive force, or by the substantially orthogonal second force, or by the second torque.

According to a particular embodiment of the invention, the fourth effort is adjustable by the second lever.

According to a particular embodiment of the invention, the prestressing means are configured to exert a fifth effort on the elongate flexible element, the fifth effort being imparted, respectively at the first effort and at the third effort, either by the first tensile/compressive force, or by the substantially orthogonal first force, or by the first torque.

According to a particular embodiment of the invention, the fifth effort is adjustable by the first lever.

According to a particular embodiment of the invention, the prestressing means are configured to exert a sixth effort on the elongate flexible element, the sixth effort being imparted, respectively to the second effort and at the fourth effort, either by the second tensile/compressive force, or by the substantially orthogonal second force, or by the second torque.

According to a particular embodiment of the invention, the sixth effort is adjustable by the second lever.

According to a particular embodiment of the invention, the longitudinal flexible element is a unique flexible blade.

According to a particular embodiment of the invention, the flexible element is arranged in a radial direction of the spiral spring.

According to a particular embodiment of the invention, the first and second levers are flexible.

According to a particular embodiment of the invention, the first and second are curved and surround at least partially the coiled strip.

According to a particular embodiment of the invention, the first and second levers comprise a first free end which can be actuated by a movement of said first free end in order to apply said efforts on the elongate flexible element.

According to a particular embodiment of the invention, the second lever comprises a second free end which can be actuated by a movement of said second free end in order to apply said efforts on the elongate flexible element.

According to a particular embodiment of the invention, the end of the strip comprises an appendix, the prestressing means and the elongate flexible element being attached to the appendix.

According to a particular embodiment of the invention, the longitudinal force(s), and possibly the torque, are continuously adjustable by the prestressing means.

According to a particular embodiment of the invention, the flexible element is arranged at an outer end of the strip.

According to a particular embodiment of the invention, the end of the strip is more rigid than the elongate flexible element and the strip.

According to a particular embodiment of the invention, the elongate flexible element and the levers are arranged at an outer end of the strip.

According to a particular embodiment of the invention, the elongate flexible element comprises a flexible neck.

According to a particular embodiment of the invention, the first and second levers are configured to enable an adjustment of the effort(s) at different intensities.

According to a particular embodiment of the invention, the first and second levers have a section or a stiffness different from one another.

The invention also relates to a rotary resonator mechanism, in particular for a horological movement, including an oscillating mass and such a spiral spring.

BRIEF DESCRIPTION OF THE FIGURES

The aims, advantages and features of the present invention will appear upon reading several embodiments given only as non-limiting examples, with reference to the appended drawings wherein.

DETAILED DESCRIPTION OF THE INVENTION

Figure 1:
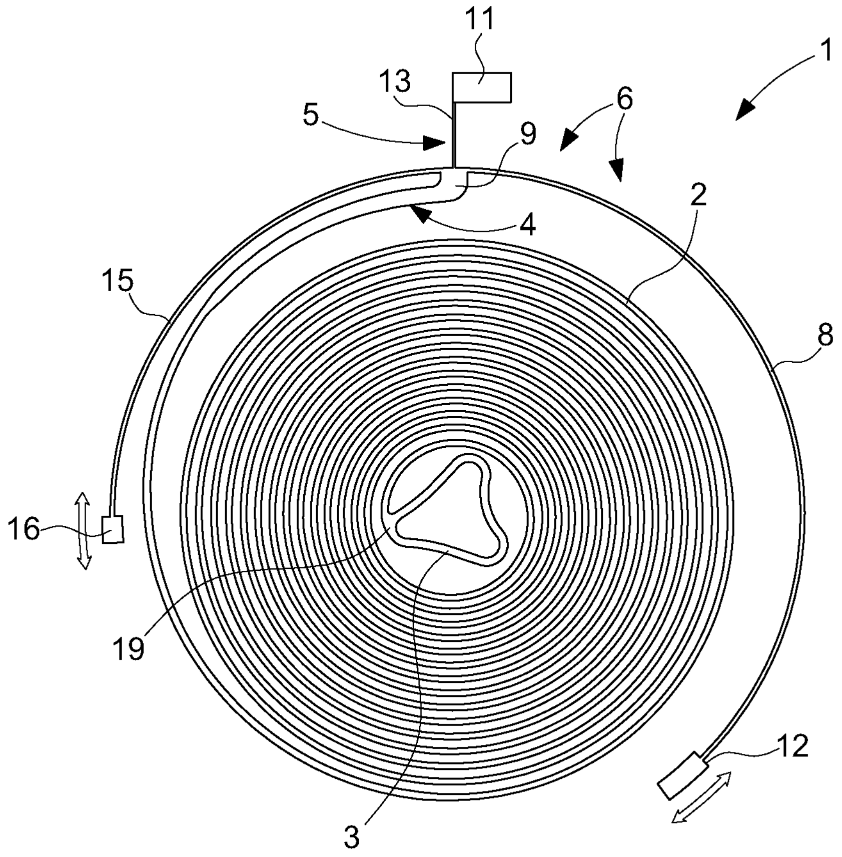
FIG. 1 schematically shows a top view of a spiral spring according to an embodiment of the invention, and FIG. 2 schematically shows an enlarged top view of the appendix and of the efforts applied on the appendix according to the first embodiment of the invention.

FIG. 1 shows a schematic illustration of an embodiment of a spiral spring 1, in particular for a horological resonator mechanism. In this case, the spiral spring 1 extends substantially in the same plane. The spiral spring 1 comprises a flexible strip 2 coiled on itself into several turns, the strip 2 having a predefined stiffness. The spiral spring 1 includes means for adjusting its stiffness. For example, the adjustment means can in particular be actuated when the spiral spring 1 is mounted on a plate of a horological movement, not shown in the figures.

According to the invention, the adjustment means include an elongate flexible element 5 extending longitudinally, which is arranged in series with the strip 2, the flexible element 5 connecting one end 4 of said strip 2 to a fixed support 11. In other words, the strip 2 is connected to the fixed support 11 only by this flexible element 5.

The flexible element 5 is secured to one of the ends 4 of the strip 2. The embodiments described hereinbelow comprise a flexible element 5 secured to the outer end 4 of the strip 2. The inner end 19 of the strip 2 is intended to be assembled to a support 3 of an oscillating mass of the resonator 1.

The flexible element 5 adds additional stiffness to that of the strip 2. Preferably, the flexible element 5 has a stiffness greater than that of the strip 2. The flexible element 5 is herein arranged in line with the strip 2. Preferably, the adjustment means 5 and the strip 2 are made in one-piece, and possibly formed from the same material.

Furthermore, the end of the strip 2 is herein curved perpendicularly to form an appendix 9. The appendix 9 serves as an attach point, and allows receiving efforts. Preferably, it is substantially rigid, i.e. at least more rigid than the strip 2 and/or the elongate flexible element 5, to minimise its influence on the stiffness of the strip 2.

Preferably, the longitudinal flexible element 5 is a unique flexible blade 13, 15 connecting the appendix 9 to the fixed support 11, 14.

The unique flexible blade 13 is arranged in line with the appendix 9. The unique flexible blade 13 is arranged in a direction perpendicular to the end of the strip 2.

Thus, the unique flexible blade 13 is arranged according to a radial direction, preferably passing through the centre of the spiral spring 1, in the rest position of the spiral spring 1.

The spiral spring 1 further includes prestressing means 6 to apply on the flexible element 5 at least two different efforts, a first effort and a second effort.

The first effort is imparted, either by a first tensile/compressive force directed substantially in the longitudinal direction $F_{L1}$ of the elongate flexible element, or by a first force directed substantially in a direction substantially orthogonal $F_{T1}$ to the longitudinal direction of the elongate flexible element, or by a first torque $M_1$, preferably a bending moment, so as to make the stiffness of the elongate flexible element vary according to the prestress level.

The second effort is imparted by a second tensile/compressive force directed substantially in the longitudinal direction $F_{L2}$ of the elongate flexible element, either by a second force directed substantially in a direction substantially orthogonal $F_{T2}$ to the longitudinal direction of the elongate flexible element 5, or by a second torque $M_2$, preferably a bending moment, so as to make the stiffness of the elongate flexible element vary according to the prestress level.

In this embodiment, the first effort is the first longitudinal tensile-compressive force $F_{L1}$, and the second effort is the orthogonal second force $F_{T2}$, which are variable. Preferably, the two forces lie in the plane of the spiral spring 1. Thus, it is possible to finely adjust the stiffness of the spiral spring 1, in particular to improve the accuracy of running of the movement.

The prestressing means 6 enable the flexible element 5 to undergo a compressive or tensile effort depending on the value of the forces. Thus, the stiffness of the flexible element 5 is varied.

Only the flexible element 5 is acted upon to modify its stiffness without acting directly on the strip 2. Thus, more accuracy is obtained because one single element is used to adjust the rigidity. During oscillations, the end 4 of the strip 2 may be movable.

In addition, the efforts, such as the longitudinal $F_{L1}$, $F_{L2}$ and orthogonal $F_{T1}$, $F_{T2}$ forces, are continuously adjustable by the prestressing means 6. In other words, the forces are not restricted to discrete values. Thus, it is possible to adjust the stiffness of the flexible element 5 with a great accuracy.

The prestressing means 6 include a first lever 8 attached to the outer end 4 of the strip 2. The first lever 8 is curved and surrounds a portion of the coiled strip 2. The first lever 8 has a semi-circular shape, or an arcuate shape with an angle at the centre close to 180°, attached to the appendix 9 of the end 4 of the strip 2.

The first lever 8 further comprises a first free end 12 which can be actuated by a movement of said first free end 12, in order to apply said efforts. Preferably, the first lever 8 is flexible. The first free end 12 is arranged opposite to the appendix 9. Preferably, the first lever 8 is arranged in the plane of the spiral spring 1. Thus, the first lever 8 allows adjusting the first effort.

The prestressing means 6 include a second lever 15 attached to the outer end 4 of the strip 2. The second lever 15 is curved and surrounds a portion of the coiled strip 2, preferably on the other side of the strip 2 with respect to the first lever 8. The second lever 15 has a semi-circular shape, or an arcuate shape with an angle at the centre close to 90°, attached to the appendix 9 of the end 4 of the strip 2.

The second lever 15 further comprises a second free end 16 which can be actuated by a movement of said first free end 16, in order to apply said efforts. The second free end 16 is arranged opposite to the appendix 9.

Preferably, the second lever 16 is flexible. Preferably, the second lever 15 is arranged in the plane of the spiral spring 1. Thus, the second lever allows adjusting the second effort. Thus, the first 8 and second 15 levers join together and are attached to the same appendix 9 of the curved portion of the end 4 of the strip 2.

The first lever 8 allows adjusting the first effort, whereas the second lever 15 allows adjusting the second effort. Thus, the two efforts are adjustable independently of one another.

Preferably, the prestressing means 6 are configured to exert other efforts on the elongate flexible element 5 by means of the first 8 and second levers. Preferably, each lever 8, 15 exerts several efforts, independently of one another, herein three efforts simultaneously.

The prestressing means 6 are configured to exert a third effort on the elongate flexible element. The third effort being imparted, respectively at the first effort, either by the first tensile/compressive force $F_{L1}$, or by the substantially orthogonal first force $F_{T1}$, or by the first torque $M_1$. In this embodiment, the third effort is the substantially orthogonal first force $F_{T1}$. The third effort is adjustable thanks to the first lever 8.

Thus, the first lever 8 allows simultaneously adjusting the first and third efforts.

The prestressing means 6 are further configured to exert a fourth effort on the elongate flexible element 5, the fourth effort being imparted, respectively at the second effort, either by the second tensile/compressive force $F_{L1}$, or by the substantially orthogonal second force $F_{T2}$, or by the second torque $M_2$. In this embodiment, the fourth effort is the substantially longitudinal second force $F_{L2}$. The fourth effort is adjustable thanks to the second lever 15.

The prestressing means 6 are also configured to exert a fifth effort on the elongate flexible element 5, the fifth effort being imparted, respectively at the first effort and at the third effort, either by the first tensile/compressive force $F_{L1}$, or by the substantially orthogonal first force $F_{T1}$, or by the first torque $M_1$.

In this embodiment, the fifth effort is the first torque $M_1$. The fifth effort is adjustable thanks to the first lever 8. The fifth effort is adjustable by the first lever 8.

The prestressing means 6 are also configured to exert a sixth effort on the elongate flexible element 5, the sixth effort being imparted, respectively at the second and at the fourth effort, either by the second tensile/compressive force $F_{L2}$, or by the substantially orthogonal second force $F_{T2}$, or by the second torque $M_2$. In this embodiment, the sixth effort is the second torque $M_2$. The second effort is adjustable by the second lever 15.

In this embodiment, the efforts produced by each lever 8, 15 are opposed, except for the longitudinal forces $F_{L1}$, $F_{L2}$ which point in the same way. However, the first 8 and second 15 levers have a similar effect on the stiffness of the elongate flexible element 5. The more a lever 8, 15 is raised, the more the stiffness of the elongate flexible element 5 increases.

Each lever allows modifying the stiffness of the elongate flexible element 5 individually, because it imparts at least two efforts.

Preferably, the first 8 and second 18 levers are configured to enable an adjustment of the efforts applied thereby at different intensities. Thus, one lever enables an adjustment in a wider setting range, and the other lever enables an adjustment in a finer setting range.

To obtain a difference in the setting intensity of the stiffness of the elongate flexible element 5 between the two levers 8, 15, the section of the two levers 8, 15 is, for example, selected different, or the stiffness of each lever 8, 15 is selected different.

Thus, the applied forces or torques are lower with a smaller section or stiffness, than with a larger section or stiffness, so that the two levers 8, 15 allow modifying the stiffness of the elongate flexible element 5 on two different scales.

Such levers 8, 15 allow keeping a spiral spring 1 with a reduced size, the dimensions being restricted so as to be able to be inserted into a horological movement.

Indeed, the prestressing means 6 have a shape which matches with the strip 2, so as to keep dimensions that are small enough, because each portion of the prestressing means 6 is close to the strip 2. Hence, the spiral spring 1 is barely modified by the prestressing means. Thus, the spiral spring 1 is compact enough so as to be able to be easily inserted into a movement.

Figure 2:
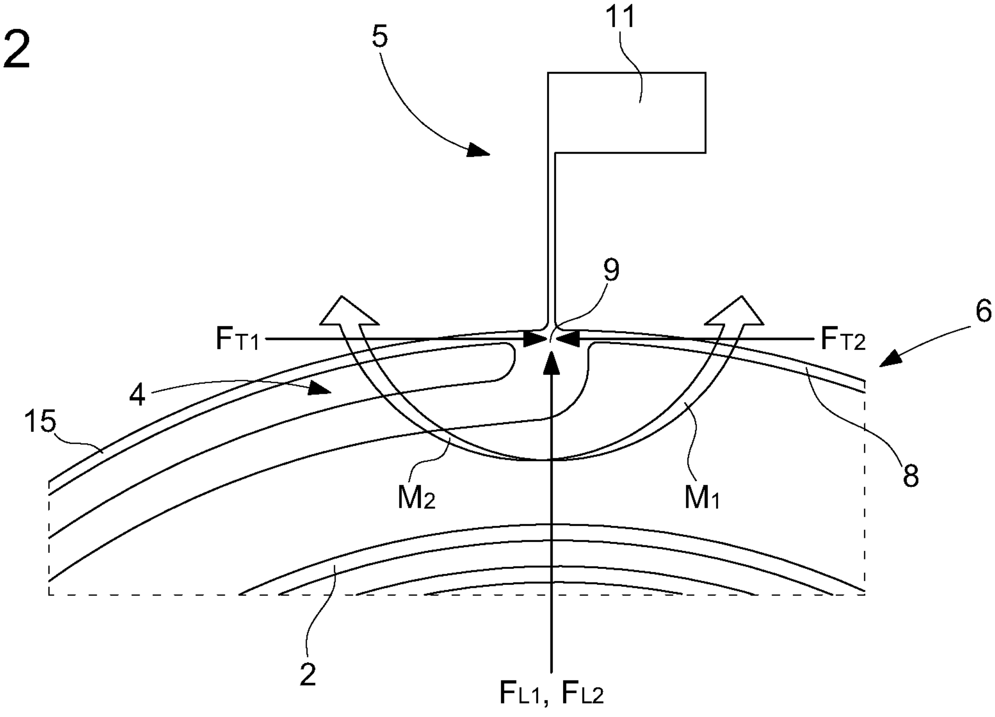

As shown in FIG. 2, actuating the first lever 8 produces on the end 4 of the strip 2 the longitudinal force $F_{L1}$ directed according to the longitudinal axis of the longitudinal flexible element 5, as well as an orthogonal force $F_{T1}$ directed according to an orthogonal direction. Actuating the first lever 8 further produces a torque or a bending moment $M_1$ on the unique blade 5, illustrated by a curved arrow.

Actuating the second lever 15 produces the longitudinal force $F_{L2}$ directed in the same way as the longitudinal force $F_{L1}$, the orthogonal force $F_{T2}$ directed opposite to the longitudinal force $F_{T1}$, and a torque $M_2$ in the opposite direction as the torque $M_1$.

Thus, the stiffness of the unique blade 13, and therefore of the set comprising the strip 2 and the unique flexible blade 13, is modified.

The longitudinal $F_{L1}$, $F_{L2}$ and orthogonal $F_{T1}$, $F_{T2}$ forces as well as the torques $M_1$, $M_2$ are varied by the movement of the first free end 12 of the first lever 8 and by the movement of the second free end 16 of the second lever 15. Preferably, the first 12 and the second free end 16 are rigid to facilitate actuation thereof. Thus, the stiffness of the flexible element 5, and therefore of the set comprising the flexible element 5 and the strip 2, is varied.

The invention also relates to a horological movement comprising such a spiral spring 1. In particular, the spiral spring is used to actuate the movement of a balance.

Of course, the invention is not limited to the embodiments described with reference to the figures and variants could be considered without departing from the scope of the invention.

As regards the longitudinal element, the flexible blades described in the different embodiments of the spiral spring, may be continuous flexible blades, as is generally the case in the figures, or blades with rigid sections and flexible necks connecting the sections.

Furthermore, the unique flexible blade may be directed according to directions other than radial and orthogonal with respect to the spiral spring. Thus, it may be directed according to any direction comprised between the radial and orthogonal directions.

The invention claimed is:

1. A spiral spring for a horological resonator mechanism, the spiral spring comprising:

a flexible strip coiled on itself into several turns, the strip having a predefined stiffness; and means for adjusting stiffness of the spiral spring, the adjustment means including a elongate flexible element arranged in series with the strip, the elongate flexible element connecting one end of said strip to a fixed support, the elongate flexible element having a stiffness higher than that of the strip, the adjustment means including prestressing means to apply at least two different efforts on the elongate flexible element, wherein the prestressing means include a first lever attached to the end of the strip so as to allow adjusting a first effort, and a second lever also attached to the end of the strip so as to adjust a second effort independently of the first effort.

2. The spiral spring according to claim 1, wherein the first effort is imparted, either by a first tensile/compressive force directed substantially in the longitudinal direction of the elongate flexible element, or by a first force directed substantially in a direction substantially orthogonal to the longitudinal direction of the elongate flexible element, or by a first torque or a bending moment, so as to make the stiffness of the elongate flexible element vary according to the prestress level.

3. The spiral spring according to claim 1, wherein the second effort is imparted either by a second tensile/compressive force directed substantially in the longitudinal direction of the elongate flexible element, or by a second force directed substantially in a direction substantially orthogonal to the longitudinal direction of the elongate flexible element, or by a second torque or a bending moment, so as to make the stiffness of the elongate flexible element vary according to the prestress level.

4. The spiral spring according to claim 1, wherein the prestressing means are configured to exert a third effort on the elongate flexible element, the third effort being imparted, respectively at the first effort, either by the first tensile/compressive force, or by the substantially orthogonal first force, or by the first torque.

5. The spiral spring according to claim 4, wherein the third effort is adjustable by the first lever.

6. The spiral spring according to claim 4, wherein the prestressing means are configured to exert a fourth effort on the elongate flexible element, the fourth effort being imparted, respectively at the second effort, either by the second tensile/compressive force, or by the substantially orthogonal second force, or by the second torque.

7. The spiral spring according to claim 6, wherein the fourth effort is adjustable by the second lever.

8. The spiral spring according to claim 6, wherein the prestressing means are configured to exert a fifth effort on the elongate flexible element, the fifth effort being imparted, respectively at the first effort and at the third effort, either by the first tensile/compressive force, or by the substantially orthogonal first force, or by the first torque.

9. The spiral spring according to claim 8, wherein the fifth effort is adjustable by the first lever.

10. The spiral spring according to claim 8, wherein the prestressing means are configured to exert a sixth effort on the elongate flexible element, the sixth effort being imparted, respectively to the second effort and at the fourth effort, either by the second tensile/compressive force, or by the substantially orthogonal second force, or by the second torque.

11. The spiral spring according to claim 10, wherein the sixth effort is adjustable by the second lever.

12. The spiral spring according to claim 1, wherein the elongate flexible element is a flexible blade.

13. The spiral spring according to claim 1, wherein the flexible element is arranged in a radial direction of the spiral spring.

14. The spiral spring according to claim 1, wherein the first and second levers are flexible.

15. The spiral spring according to claim 1, wherein the first lever comprises a first free end which can be actuated by a movement of said first free end in order to apply said efforts on the elongate flexible element, and the second lever comprises a second free end which can be actuated by a movement of said second free end in order to apply said efforts on the elongate flexible element.

16. The spiral spring according to claim 1, wherein the first and second levers are configured to enable an adjustment of the effort(s) at different intensities.

17. The spiral spring according to claim 16, wherein the first and second levers have a section or a stiffness different from one another.

18. The spiral spring according to claim 1, wherein the effort(s) is/are continuously adjustable by the prestressing means.

19. The spiral spring according to claim 1, wherein the flexible element and the levers are arranged at an outer end of the strip.

20. A rotary resonator mechanism for a horological movement, including an oscillating mass, wherein the resonator mechanism includes the spiral spring according to claim 1.

* * * * *